United States Patent
Koo

(10) Patent No.: US 10,309,272 B2
(45) Date of Patent: Jun. 4, 2019

(54) CONTROL METHOD AND SYSTEM FOR STABILITY OF INTERMEDIATE PHASE CONTINUOUSLY VARIABLE VALVE TIMING SYSTEM

(71) Applicants: Hyundai Motor Company, Seoul (KR); Kia Motors Corporation, Seoul (KR)

(72) Inventor: Bon-Chang Koo, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 65 days.

(21) Appl. No.: 15/622,257

(22) Filed: Jun. 14, 2017

(65) Prior Publication Data

US 2018/0016951 A1 Jan. 18, 2018

(30) Foreign Application Priority Data

Jul. 13, 2016 (KR) .......................... 10-2016-0088545

(51) Int. Cl.
*F01L 1/34* (2006.01)
*F01L 1/344* (2006.01)
*F01L 1/04* (2006.01)
*F02D 41/14* (2006.01)
*F02D 41/22* (2006.01)
*F01L 13/00* (2006.01)
*F02D 41/00* (2006.01)

(52) U.S. Cl.
CPC ............... *F01L 1/3442* (2013.01); *F01L 1/04* (2013.01); *F01L 13/00* (2013.01); *F02D 41/1401* (2013.01); *F02D 41/22* (2013.01); *F01L 2800/00* (2013.01); *F01L 2800/11* (2013.01); *F01L 2800/18* (2013.01); *F02D 2041/001* (2013.01); *F02D 2200/021* (2013.01); *F02D 2200/101* (2013.01); *Y02T 10/40* (2013.01)

(58) Field of Classification Search
CPC ....... F01L 1/04; F01L 1/3442; F01L 2800/11; F02D 41/22; F02D 2041/001; F02D 2200/021; F02D 2200/101
USPC ........................................... 123/90.15, 90.17
See application file for complete search history.

(56) References Cited

U.S. PATENT DOCUMENTS 7,219,636 B2 * 5/2007 Sawada .................... F01L 1/022
  123/90.15
8,116,965 B2 * 2/2012 Okamoto ............ F01L 13/0026
  123/198 D

FOREIGN PATENT DOCUMENTS

JP  2007-332957 A  12/2007
JP  2009-299503 A  12/2009
(Continued)

*Primary Examiner* — Ching Chang
(74) *Attorney, Agent, or Firm* — Morgan, Lewis & Bockius LLP

(57) ABSTRACT

A control method for stability of an intermediate phase Continuously Variable Valve Timing (CVVT) system may include comparing an oil temperature of the intermediate phase CVVT system with a predetermined value, and interrupting an operation of controlling the CVVT system when the oil temperature is lower than the predetermined value, comparing an engine RPM with a predetermined value, and interrupting the operation of controlling the CVVT system when the engine RPM is lower than the predetermined value, and comparing an operating current of the CVVT system with a predetermined management value A when the operation of controlling the CVVT system is not interrupted.

14 Claims, 3 Drawing Sheets

(56) References Cited

FOREIGN PATENT DOCUMENTS

| JP | 2016-109103 A | 6/2016 |
|---|---|---|
| KR | 10-2004-0011927 A | 2/2004 |

* cited by examiner

CONTROL METHOD AND SYSTEM FOR STABILITY OF INTERMEDIATE PHASE CONTINUOUSLY VARIABLE VALVE TIMING SYSTEM

CROSS-REFERENCE(S) TO RELATED APPLICATIONS

The present application claims priority to Korean Patent Application No. 10-2016-0088545, filed on Jul. 13, 2016, the entire contents of which is incorporated herein for all purposes by this reference.

BACKGROUND OF THE INVENTION

Field of the Invention

Exemplary embodiments of the present invention relate to a system for controlling an intermediate phase Continuously Variable Valve Timing (CVVT) system; and, to a method of controlling the intermediate phase CVVT system wherein the control stability of the CVVT system is prevented from being reduced, and an engine misfire is prevented from occurring due to a delay in responsiveness, and to a system for embodying the same.

Description of Related Art

To enhance the fuel efficiency of a vehicle, reduce the exhaust gas, increase the low-speed torque and enhance the output of the vehicle, a continuously variable valve timing system or a camshaft phaser system (hereinafter, referred to as a CVVT system) which optimizes and controls the timing of opening or closing the intake and exhaust valves of an engine depending on the RPM of the engine has been developed and used.

Recently, in an effort to improve the performance of such a CVVT system, an intermediate phase continuously variable valve timing system (hereinafter, referred to as an intermediate phase CVVT system), which enhances the responsiveness of a system and expand a cam operating region, was provided.

In the intermediate phase CVVT system, the effect of enhancing the fuel efficiency by reducing a pumping loss due to an increase in overlap of the intake and exhaust valves is further enhanced. Furthermore, an exhaust gas reduction effect is further enhanced by re-combusting combustion gas due to internal exhaust gas recirculation (EGR) through a valve overlap optimization depending on conditions of the engine. In addition, low-speed torque increase and output enhancement effects are further enhanced by increasing the volume efficiency due to optimization in timing of the intake valve depending on conditions of the engine. Therefore, the intermediate phase CVVT system can improve the effects of enhancing the fuel efficiency and reducing the exhaust gas, compared to that of the CVVT system.

To achieve the above-mentioned purposes, in the intermediate phase CVVT system, when a control operation for overcoming a difference between a target cam value and a current cam value is performed, the position of the cam is controlled at an intermediate phase rather than being controlled at the most delayed angle (intake) or the most advanced position (exhaust). Accordingly, the responsiveness of the system is enhanced and the cam operating region can be increased, compared to those of the CVVT system.

The intermediate phase CVVT system can have the effect of enhancing the responsiveness through precise control, but in a region in which the oil temperature and the RPM of the engine are low a delay in responsiveness is caused. Consequently, precise control is impossible.

The delay in responsiveness mainly occurs when the intermediate phase CVVT system is controlled wherein Open Loop Response Time (OLRT) is 100° (crank angle)/sec. The present feature makes the efficiency of emission effect for reducing harmful substances be reduced.

Furthermore, there is a problem in that, when the RPM of the engine is excessively varied, an engine misfire is caused.

Moreover, the intermediate phase CVVT system must comply with regulations in which performance assurance must be satisfied under conditions of an oil temperature range from −10° C. to 130° C. and an engine RPM of 500 RPM or more. Therefore, responsiveness delay which is caused under some certain low-speed and high-temperature conditions may reduce the reliability in performance assurance of the intermediate phase CVVT system.

The foregoing is intended merely to aid in the understanding of the background of the present invention, and is not intended to mean that the present invention falls within the purview of the related art that is already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method and system for stability of an intermediate phase CVVT system which can control the intermediate phase CVVT system wherein an engine misfire or ignition off is prevented from occurring due to unstable operating control of the intermediate phase CVVT system, and secure the reliability in performance assurance of the intermediate phase CVVT system.

Other aspects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with various aspects of the present invention, there is provided a control method for stability of an intermediate phase Continuously Variable Valve Timing (CVVT) system, including: comparing an oil temperature of the intermediate phase CVVT system with a reference value, and interrupting an operation of controlling the CVVT system when the oil temperature is lower than the reference value; comparing an engine RPM with a reference value, and interrupting the operation of controlling the CVVT system when the engine RPM is lower than the reference value; and comparing an operating current of the CVVT system with a predetermined management value A when the operation of controlling the CVVT system is not interrupted.

When the operating current of the CVVT system is lower than the management value A, a target Pulse Width Modulation (PWM) duty signal corresponding to a CVVT error value may be outputted.

The CVVT error value may be a difference between a target CVVT value and a current CVVT value.

When the operating current of the CVVT system is greater than the management value A, the operating current of the CVVT system may be compared with a predetermined management value B. When the operating current of the CVVT system is lower than the management value B, a target Pulse Width Modulation (PWM) duty signal corresponding to the oil temperature and the operating current of the CVVT system may be outputted.

When the operating current of the CVVT system is greater the management value B, it may be determined that a failure has occurred, and the operation of controlling the CVVT system may be interrupted.

In accordance with another exemplary embodiment of the present invention, there is provided a control method for stability of an intermediate phase Continuously Variable Valve Timing (CVVT) system, including: comparing an operating current of the intermediate phase CVVT system with a predetermined management value C, and determining that a failure has occurred, when the operating current is lower than the management value C, and interrupting an operation of controlling the CVVT system.

When the operating current of the intermediate phase CVVT system is lower than a management value B lower than the management value C, a target Pulse Width Modulation (PWM) duty signal for controlling the intermediate phase CVVT system may be outputted.

In accordance with another exemplary embodiment of the present invention, there is provided a control system for stability of an intermediate phase Continuously Variable Valve Timing (CVVT) system, including: an RPM measurement device configured to measure an engine RPM; an oil temperature detecting device configured to detect an oil temperature of the intermediate phase CVVT system; an operating current detecting device configured to detect an operating current of the intermediate phase CVVT system; and a CVVT control device configured to compare the engine RPM measured by the RPM measurement device with a reference value, compare the oil temperature detected by the oil temperature detecting device with a reference value, and compare the operating current of the CVVT system with a predetermined management value.

When the engine RPM and the oil temperature respectively exceed the reference values, the CVVT control device may compare the operating current of the CVVT system measured by the operating current detecting device with a management value A.

When the operating current of the CVVT system is lower than the management value A, the CVVT control device may output a target Pulse Width Modulation (PWM) duty signal corresponding to a CVVT error value.

The CVVT error value may be a difference between a target CVVT value and a current CVVT value.

When the operating current of the CVVT system is greater than the management value A, the CVVT control device may compare the operating current of the CVVT system with a management value B.

When the operating current of the CVVT system is lower than the management value B, a target Pulse Width Modulation (PWM) duty signal corresponding to the oil temperature and the operating current of the CVVT system may be outputted.

When the operating current of the CVVT system is greater the management value B, it may be determined that a failure has occurred, and an operation of controlling the CVVT system may be interrupted.

When the operating current of the CVVT system is greater than the management value B, the CVVT control device may compare the operating current of the CVVT system with a predetermined management value C, determine that a failure has occurred, when the operating current is lower than the management value C, and interrupt an operation of controlling the CVVT system.

The methods and apparatuses of the present invention have other features and advantages which will be apparent from or are set forth in more detail in the accompanying drawings, which are incorporated herein, and the following Detailed Description, which together are configured to explain certain principles of the present invention.

Figure 1:
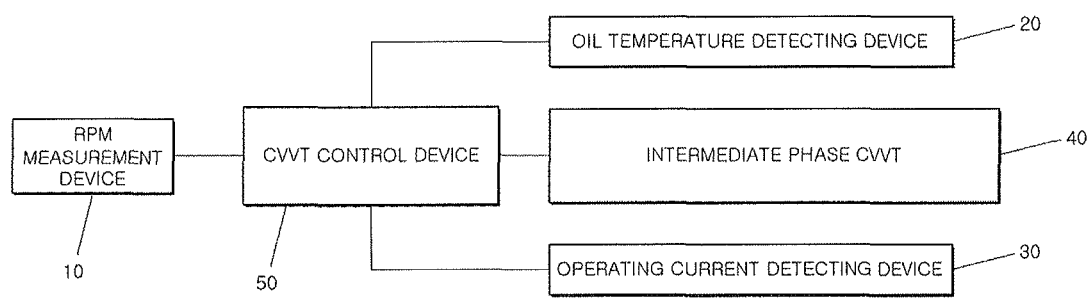
FIG. 1 is a diagram conceptually illustrating a control system for stability of an intermediate phase CVVT system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

It will be understood that when an element including a layer, a film, a region, or a plate is referred to as being "above" another element, it can be "immediately above" the other element or intervening elements may also be present. In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge thereof.

Figure 2A:
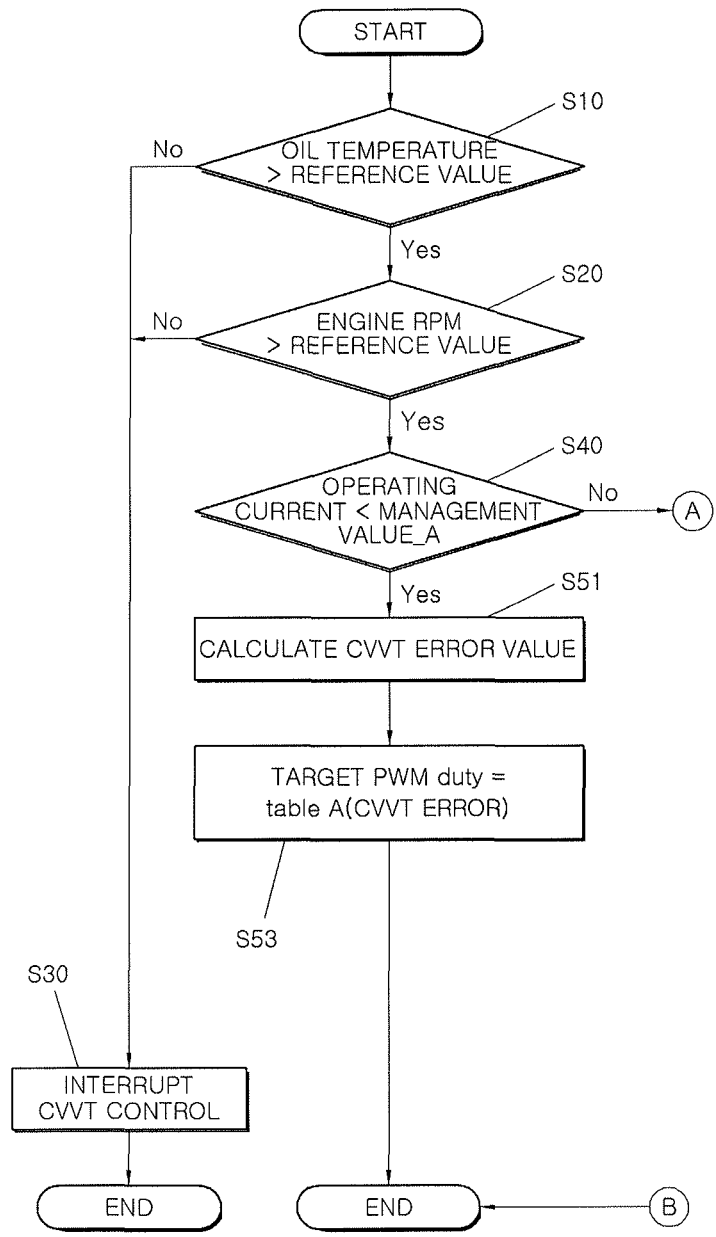
FIG. 2A and FIG. 2B illustrates an algorithm for a control method for stability of the intermediate phase CVVT system according to an exemplary embodiment of the present invention.
Figure 2B:
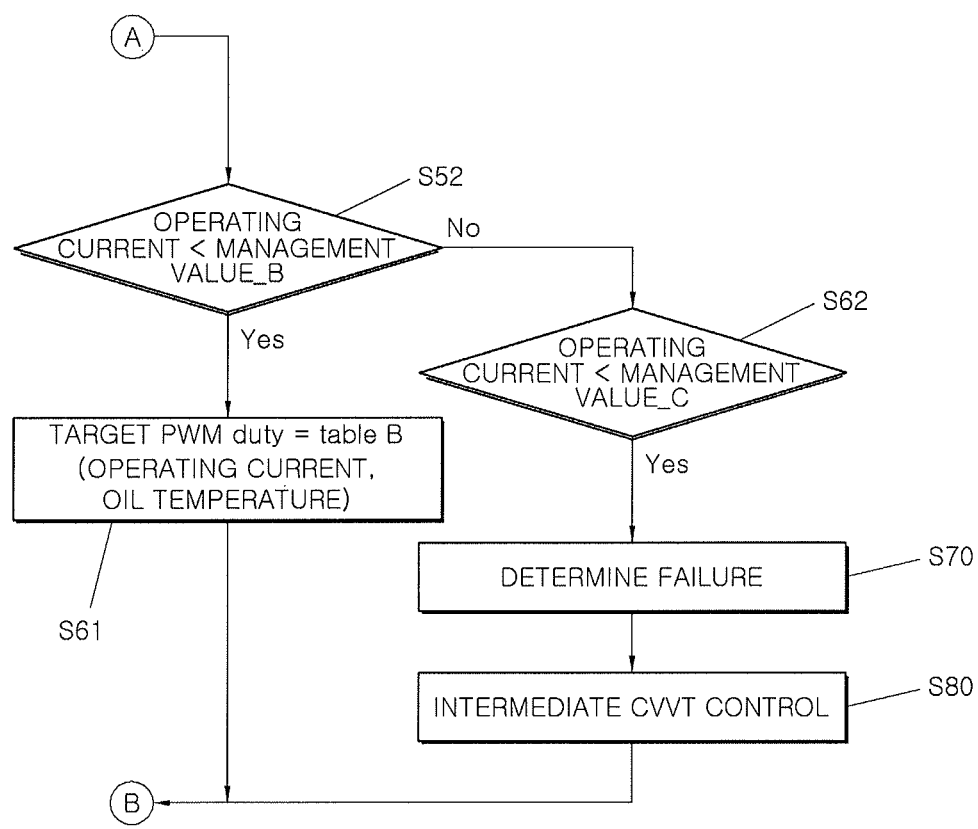

FIG. 1 is a diagram conceptually illustrating a control system for stability of an intermediate phase CVVT system according to an exemplary embodiment of the present invention, and FIG. 2 illustrates an algorithm for a control method for stability of the intermediate phase CVVT system according to an exemplary embodiment of the present invention.

Hereinafter, intermediate phase CVVT stability control method and system according to an exemplary embodiment of the present invention will be described with reference to FIG. 1 and FIG. 2.

In the intermediate phase CVVT stability control method and system according to an exemplary embodiment of the present invention, operating current of an intermediate phase CVVT system is monitored so that the operating current is controlled to be within a predetermined range, whereby the stability can be enhanced. Furthermore, depending on certain conditions, the CVVT control may be interrupted. In the present way, the CVVT system can be stability controlled.

First, the oil temperature in the intermediate phase CVVT system is compared with a reference value (S10).

The temperature of the oil is detected by an oil temperature detecting device 20. Information about the detected oil temperature is transmitted to a CVVT control device 50. The CVVT control device compares the temperature of the oil with the reference value.

The CVVT control device 50 may be separately configured, and an existing Electronic Control Unit (ECU) configured to control an engine, etc. may function as the CVVT control device 50.

When the oil temperature is lower than the reference value, the CVVT control is interrupted so that the CVVT system can be prevented from being unstably controlled, and the system can comply with the performance assurance.

The reference value of the oil temperature is approximately −10° C. and is the minimum reference value for the oil temperature.

Furthermore, the CVVT control device 50 receives RPM information measured by an engine RPM measurement device 10 and compares the RPM information with an RPM reference value (S20). As a result, when the RPM is lower than the reference value, the control of the CVVT system is interrupted (S30).

The present step is also a control operation for making it possible for the CVVT system to be stably controlled and to comply with the performance assurance. The reference value of the RPM is approximately 500 RPM, and the present value is the minimum reference value for the RPM.

The sequence of the oil temperature and RPM comparing and determining operations of respective step S10 and S20 is not clearly defined, and step S20 may be first performed, or step S10 and step S20 may be simultaneously performed.

As a result of step S10 and S20, when the oil temperature and the engine RPM respectively exceed the reference values and meet the conditions, the intermediate phase CVVT control operation is performed.

The system according to an exemplary embodiment of the present invention is provided with an operating current detecting device 30. The operating current detecting device 30 detects the operating current of the intermediate phase CVVT system 40 and transmits it to the CVVT control device 50. The CVVT control device 50 compares the received operating current with a predetermined management value A (S40).

As a result of the comparison, when the CVVT operating current is lower than the management value A, a target pulse width modulation (PWM) duty signal corresponding to a CVVT error value is outputted to control the intermediate phase CVVT system (S53).

That is, the case where the operating current is lower than the management value A refers to the case where a current CVVT value, that is, a current cam phase, does not reach a target CVVT value, that is, a target cam phase. A difference between these values is determined as a CVVT error value (S51). In response to the present error value, a target PWM duty signal corresponding to data-stored table A is outputted, whereby the output signal is transmitted to an oil-flow control valve (OCV) to control the intermediate phase CVVT system.

Occurrence of such a difference between the target cam phase and the current cam phase means that a predetermined time has passed after an initial start of the engine. In the present case, the control operation corresponds to a time-based phase control operation.

On the other hand, in the case where the CVVT operating current is larger than the management value A, the CVVT control device 50 compares the operating current with a predetermined management value B (S52). When the operating current is lower than the management value B, a target PWM duty signal corresponding to current oil temperature and CVVT operating current is outputted so that the outputted signal is transmitted to the OCV to control the intermediate phase CVVT system (S61).

The present case refers an instance where the current CVVT value does not reaches the target CVVT value, unlike that of step S53. In the present case, depending on variables including operating current and oil temperature, a target PWM duty signal corresponding to data-stored table B is outputted, whereby the CVVT system can be controlled.

In the present case, there is no difference between the target cam phase and the current cam phase. The present instance refers to the initial start state or idle state of the engine. The control operation in the present case corresponds to a current-based phase control operation.

In the foregoing normal intermediate phase CVVT control operation, the time-base phase control operation and the current-base phase control operation are switched therebetween depending on the result of the above-mentioned determination.

However, when the CVVT operating current is greater than the management value B, the CVVT control device 50 compares the operating current with a predetermined management value C (S62). As a result of the comparison, when the CVVT operating current is lower than the management value C, it is determined that the CVVT system has malfunctioned (S70). Thus, a failure code is generated, and the code is recorded and stored. The CVVT control operation is immediately interrupted (S80).

Accordingly, the operating current of the CVVT system is monitored and then controlled to be within a predetermined range. Furthermore, the CVVT system is configured wherein when the operating current is excessively high, the CVVT control operation is interrupted. In the present way, the CVVT system can be stably controlled.

In addition, the CVVT system is controlled wherein, when it is out of the performance assurance range, the CVVT control operation is also interrupted. Accordingly, the reliability of the system can be secured.

Consequently, the present invention can also prevent an event including an engine misfire or ignition off because of instable control in the operation of the CVVT system.

In the present control method and system for stability of an intermediate phase CVVT system, the CVVT system is controlled wherein, when an oil temperature and an engine RPM do not satisfy reference values, phase control is interrupted. Accordingly, the performance assurance of the intermediate phase CVVT system can be satisfied.

Furthermore, through feedback of operating current of the intermediate phase CVVT system, only when the corresponding value is lower than a management value A or it is lower than a management value B, even though it is higher than the management value A, the CVVT phase control operation is possible, and when the value exceeds the management value B but does not exceed a management value C, it is immediately determined that a failure has occurred, and the control operation is interrupted. Accordingly, short or ignition off of the engine can be prevented.

Accordingly, the operating current of the CVVT system is controlled to be within a predetermined range, whereby the stability of the CVVT system can be secured.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for stability of an intermediate phase Continuously Variable Valve Timing (CVVT) system, comprising:
    comparing an oil temperature of the intermediate phase CVVT system with a predetermined oil temperature value, and interrupting an operation of controlling the CVVT system when the oil temperature is lower than the predetermined oil temperature value;
    comparing an engine RPM with a predetermined RPM value, and interrupting the operation of controlling the CVVT system when the engine RPM is lower than the predetermined RPM value; and
    comparing an operating current of the CVVT system with a predetermined management value A when the operation of controlling the CVVT system is not interrupted.

2. The control method of claim 1, wherein, when the operating current of the CVVT system is lower than the predetermined management value A, a target Pulse Width Modulation (PWM) duty signal corresponding to an intermediate phase CVVT error value is outputted.

3. The control method of claim 2, wherein the intermediate phase CVVT error value is a difference between a target intermediate phase CVVT value and a current intermediate CVVT value.

4. The control method of claim 1, wherein, when the operating current of the CVVT system is greater than the predetermined management value A, the operating current of the CVVT system is compared with a predetermined management value B.

5. The control method of claim 4, wherein, when the operating current of the CVVT system is lower than the predetermined management value B, a target Pulse Width Modulation (PWM) duty signal corresponding to the oil temperature and the operating current of the CVVT system is outputted.

6. The control method of claim 4, wherein, when the operating current of the CVVT system is greater than the predetermined management value B, it is configured to be determined that a failure has occurred, and the operation of controlling the CVVT system is interrupted.

7. A control system for stability of an intermediate phase Continuously Variable Valve Timing (CVVT) system, comprising:
    an RPM measurement device configured to measure an engine RPM;
    an oil temperature detecting device configured to detect an oil temperature of the intermediate phase CVVT system;
    an operating current detecting device configured to detect an operating current of the intermediate phase CVVT system; and
    a CVVT controller configured to compare the engine RPM measured by the RPM measurement device with a predetermined RPM value, compare the oil temperature detected by the oil temperature detecting device with a predetermined oil temperature value, and compare the operating current of the CVVT system with a predetermined management value of current.

8. The control system of claim 7, wherein, when the engine RPM and the oil temperature respectively exceeds the predetermined RPM value and the predetermined oil temperature value, the CVVT controller is configured to compare the operating current of the CVVT system measured by the operating current detecting device with a management value A.

9. The control system of claim 8, wherein, when the operating current of the CVVT system is lower than the management value A, the CVVT controller outputs a target Pulse Width Modulation (PWM) duty signal corresponding to an intermediate phase CVVT error value.

10. The control system of claim 9, wherein the intermediate phase CVVT error value is a difference between a target intermediate phase CVVT value and a current intermediate phase CVVT value.

11. The control system of claim 8, wherein, when the operating current of the CVVT system is greater than the predetermined management value A, the CVVT controller is configured to compare the operating current of the CVVT system with a predetermined management value B.

12. The control system of claim 11, wherein, when the operating current of the CVVT system is lower than the predetermined, management value B, a target Pulse Width Modulation (PWM) duty signal corresponding to the oil temperature and the operating current of the CVVT system is outputted.

13. The control system of claim 11, wherein, when the operating current of the CVVT system is greater than the predetermined management value B, it is configured to be determined that a failure has occurred, and an operation of controlling the CVVT system is interrupted.

14. The control system of claim 11, wherein, when the operating current of the CVVT system is greater than the predetermined management value B, the CVVT controller is configured to compare the operating current of the CVVT system with a predetermined management value C, is configured to determine that a failure has occurred, when the operating current is lower than the predetermined management value C, and interrupts an operation of controlling the CVVT system.

* * * * *